United States Patent
Au et al.

(10) Patent No.: US 11,481,156 B1
(45) Date of Patent: Oct. 25, 2022

(54) THROUGHPUT MANAGEMENT OF DISTRIBUTED STORAGE SYSTEM

(71) Applicant: Marvell Asia Pte, Ltd., Singapore (SG)

(72) Inventors: Siu-Hung Au, Fremont, CA (US); Madhusudan Kalluri, Fremont, CA (US); Yun-Ho Wu, Milpitas, CA (US); Wenxiang Ding, Milpitas, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/187,325

(22) Filed: Feb. 26, 2021

Related U.S. Application Data

(60) Provisional application No. 62/981,946, filed on Feb. 26, 2020.

(51) Int. Cl.
*G06F 3/06* (2006.01)
*H04L 67/1097* (2022.01)

(52) U.S. Cl.
CPC .......... *G06F 3/0659* (2013.01); *G06F 3/0613* (2013.01); *G06F 3/0653* (2013.01); *G06F 3/0688* (2013.01); *H04L 67/1097* (2013.01)

(58) Field of Classification Search
CPC .... G06F 3/0659; G06F 3/0613; G06F 3/0653; G06F 3/0688; H04L 67/1097
See application file for complete search history.

(56) References Cited

U.S. PATENT DOCUMENTS

| | | | | |
|---|---|---|---|---|
| 2004/0044770 | A1* | 3/2004 | Messick | H04L 9/40 709/226 |
| 2007/0180119 | A1* | 8/2007 | Khivesara | H04L 47/762 709/226 |
| 2015/0324255 | A1* | 11/2015 | Kochunni | G06F 3/067 711/162 |
| 2017/0249104 | A1* | 8/2017 | Moon | G06F 3/0673 |
| 2018/0121102 | A1* | 5/2018 | Paulzagade | G06F 3/0667 |
| 2021/0208924 | A1* | 7/2021 | Krueger | G06F 9/467 |

\* cited by examiner

*Primary Examiner* — Nicholas J Simonetti

(57) ABSTRACT

Methods and systems for managing access to a distributed storage systems include storing a total bandwidth utilization amount allocated to each of a plurality of client devices and a current bandwidth amount utilized by each of the plurality of client devices. An actual bandwidth amount utilized for servicing one or more requests received from a plurality of client devices over a network is monitored and an expected bandwidth utilization amount for servicing a request to access a distributed storage system having a plurality of storage devices interconnected over a network, received from respective ones of the plurality of client devices is determined. The client device transmitting the request is either permitted or denied access to the distributed storage system based on a function of the expected bandwidth utilization of the request relative to the total bandwidth utilization amount allocated to the requesting client device.

20 Claims, 11 Drawing Sheets

THROUGHPUT MANAGEMENT OF DISTRIBUTED STORAGE SYSTEM

CROSS REFERENCE TO RELATED APPLICATION

This disclosure claims the benefit of commonly-assigned U.S. Provisional Patent Application No. 62/981,946, filed Feb. 26, 2020, which is hereby incorporated by reference herein in its entirety.

FIELD OF USE

This disclosure relates to throughput management of distributed storage system. More particularly, this disclosure relates to methods and systems that dynamically manage client requests from different client devices to access the distributed storage systems.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

A distributed storage system typically serves as a plurality of independently controlled storage devices, such as solid-state drives (SSDs) interconnected over a network. One challenge facing operators of distributed storage systems is ensuring that storage usage by various client devices remains within limits agreed to with their customers. This can be particularly challenging in an environment in which the distributed storage system is accessed by various multiple client requests (typically from other network client devices) that are received over a network fabric and queued. With multiple client requests that may be queued, it is necessary to arbitrate among various client requests and determine an order in which each of the client requests are to be processed in a given time interval. In conventional arrangements, monitoring traffic over the network fabric to access the distributed data system is performed using a round robin or weighted round robin scheme. However, such arrangements have been found lacking because a particular client device can send in a continuous flow of client requests to access the distributed storage system, which are processed on a first in first out (FIFO) manner and result in some client devices being underserved in the given time interval.

SUMMARY

According to implementations of the subject matter of this disclosure, a storage system (system) includes a storage circuitry, which stores data including a total bandwidth utilization amount allocated to each of a plurality of client devices for a time interval and a current bandwidth amount utilized by each of the plurality of client devices during the time interval. The storage system also includes a bandwidth monitoring circuitry configured to monitor an actual bandwidth amount utilized for servicing one or more requests received from respective ones of the plurality of client devices over a network. The bandwidth monitoring circuitry is also configured to determine an expected bandwidth utilization amount for servicing a request received from respective ones of the plurality of client devices over the network. The request includes a request to access a distributed storage system comprising a plurality of storage devices interconnected over a network. The storage system also includes an arbiter circuitry configured to, for a request of a plurality of requests received from respective ones of the plurality of client devices during the time interval, one of permit or deny the client device transmitting the request access to the distributed storage system based on a function of the expected bandwidth utilization of the request relative to the total bandwidth utilization amount allocated to the requesting client device.

A first implementation of such a system in which the bandwidth monitoring circuitry upon receiving the request to access the distributed storage system, determine whether the received request is one of a request to read data from the distributed storage system, or a request to write data into the distributed storage system.

In a first instance of that first implementation, upon determining that the received request is one of a request to read data from the distributed storage system, or a request to write data into the distributed storage system, the bandwidth monitoring circuitry determines the expected bandwidth utilization amount by calculating a volume of data to be read or written within a period of time when servicing the received request.

A second implementation of such a system in which the arbiter circuitry denies the client device transmitting the request to access the distributed storage system when the expected bandwidth utilization amount for servicing the received request is greater than a difference between the total bandwidth utilization amount allocated to the client device transmitting the request and the current bandwidth amount utilized by the client device transmitting the request during the time interval.

In a third implementation of such a system in which the arbiter circuitry permits the client device transmitting the request to access the distributed storage system when the expected bandwidth utilization amount for servicing the received request is less than or equal to a difference between the total bandwidth utilization amount allocated to the client device transmitting the request and the current bandwidth amount utilized by the client device transmitting the request during the time interval.

In a fourth implementation of such a system in which the arbiter circuitry updates the current bandwidth amount utilized by the respective ones of the plurality of client devices after the respective ones of the plurality of client devices are permitted access to the distributed storage system.

In a fifth implementation of such a system the storage system includes a priority circuitry communicably coupled to the arbiter circuitry such that the priority circuitry is configured to assign a level of priority to a respective request among the plurality of requests to access the distributed storage system based on the current bandwidth utilization amount utilized by the respective ones of the plurality of client devices and the total bandwidth utilization amount allocated to the respective ones of the plurality of client devices.

In a first instance of that fifth implementation, a first request of the plurality of requests to access the distributed storage system is received from a first client device of the plurality of client devices, and a second request of the plurality of requests to access the distributed storage system is received from a second client device of the plurality of client devices. The priority circuitry assigns a first value of the priority level to the first request received from the first client device and a second value, which is higher than the first value, of the priority level to the second request received from the second client device. The arbiter circuitry allows access to the distributed storage system to the first client device prior to allowing the second client device to access the distributed storage system.

In a second instance of that fifth implementation, the priority circuitry assigns one of a high priority level, a normal priority level, and a no service priority level, and wherein the normal priority level is lower than the high priority level, and the no service priority level is lower than the normal priority level.

In a third instance of that fifth implementation, the total bandwidth utilization amount allocated to each of the respective ones of the plurality of client devices includes a respective maximum bandwidth value and a respective minimum bandwidth value. The priority circuitry assigns the high priority level to each respective request in the plurality of requests when the current bandwidth amount utilized by the respective ones of the plurality of client devices is less than the respective minimum bandwidth value. The priority circuitry assigns the normal priority level to each respective request in the plurality of requests when the current bandwidth amount utilized by the respective ones of the plurality of client devices is equal to or greater than the respective minimum bandwidth value and less than the respective maximum bandwidth value. The priority circuitry assigns the no service priority level to each respective request in the plurality of requests when the current bandwidth amount utilized by the respective ones of the plurality of client devices is equal to or greater than the respective maximum bandwidth value.

According to other implementations of the subject matter of this disclosure, a method includes storing data including a total bandwidth utilization amount allocated to each of a plurality of client devices for a time interval and a current bandwidth amount utilized by each of the plurality of client devices during the time interval, monitoring actual bandwidth amount utilized for servicing one or more requests received from respective ones of the plurality of client devices over a network, determining an expected bandwidth utilization amount for servicing a request received from respective ones of the plurality of client devices over the network, wherein the request comprises a request to access a distributed storage system formed a plurality of storage devices interconnected over the network and for a request of a plurality of requests received from respective ones of the plurality of client devices during the time interval, executing one of permitting or denying the client device transmitting the request access to the distributed storage system based on a function of the expected bandwidth utilization of the request relative to the total bandwidth utilization amount allocated to the requesting client device.

A first implementation of such a method may further include, in response to permitting the client device transmitting the request access to the distributed storage system, permitting the client to read data from the distributed storage system when the request to access the distributed storage system is a read request and permitting the client to write data into the distributed storage system when the request to access the distributed storage system is a write request.

In a first instance of that first implementation, determining the expected bandwidth utilization amount may further include calculating a volume of data to be read or written within a period of time when servicing the received request.

A second implementation of such a method may further include, denying the client device transmitting the request access to the distributed storage system when the expected bandwidth utilization amount for servicing the received request is greater than the difference between the total bandwidth utilization amount allocated to the client device transmitting the request and the current bandwidth amount utilized by the client device transmitting the request during the time interval.

A third implementation of such a method may further include, permitting the client device transmitting the request access to the distributed storage system when the expected bandwidth utilization amount for servicing the received request is less or equal to the difference between the total bandwidth utilization amount allocated to the client device transmitting the request and the current bandwidth amount utilized by the client device transmitting the request during the time interval.

A fourth implementation of such a method may further include, updating the current bandwidth utilization amount utilized by the respective ones of the plurality of client devices after the respective ones of the plurality of client devices are permitted access to the distributed storage system.

A fifth implementation of such a method may further include, assigning a level of priority to a respective request among the plurality of requests to access the distributed storage system based on the current bandwidth utilization amount utilized by the respective ones of the plurality of client devices and the total bandwidth utilization amount allocated to the respective ones of the plurality of client devices.

In a first instance of that fifth implementation, wherein a first request of the plurality of requests to access the distributed storage system is received from a first client device of the plurality of client devices, and a second request of the plurality of requests to access the distributed storage system is received from a second client device of the plurality of client devices. The method further includes assigning a first value of the priority level to the first request received from the first client device and a second value of the priority level to the second request received from the second client device, wherein the first value is higher than the second value and allowing access to the distributed storage system to the first client device prior to allowing the second client device to access the distributed storage system.

In a second instance of that fifth implementation, the level of priority includes a high priority level, a normal priority level, and a no service priority level. The normal priority level is lower than the high priority level, and the no service priority level is lower than the normal priority level.

In a third instance of that fifth implementation, wherein the total bandwidth utilization amount allocated to each of the respective ones of the plurality of client devices comprise a respective maximum bandwidth value and a respective minimum bandwidth value. The method includes assigning the high priority level to each respective request in the plurality of requests when the current bandwidth amount utilized by the respective ones of the plurality of client devices is less than the respective minimum bandwidth value. The method also includes assigning the normal priority level to each respective request in the plurality of requests when the current bandwidth amount utilized by the respective ones of the plurality of client devices is equal to or greater than the respective minimum bandwidth value and less than the respective maximum bandwidth value. The method further includes assigning the no service priority level to each respective request in the plurality of requests when the current bandwidth amount utilized by the respective ones of the plurality of client devices is equal to or greater than the respective maximum bandwidth value.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
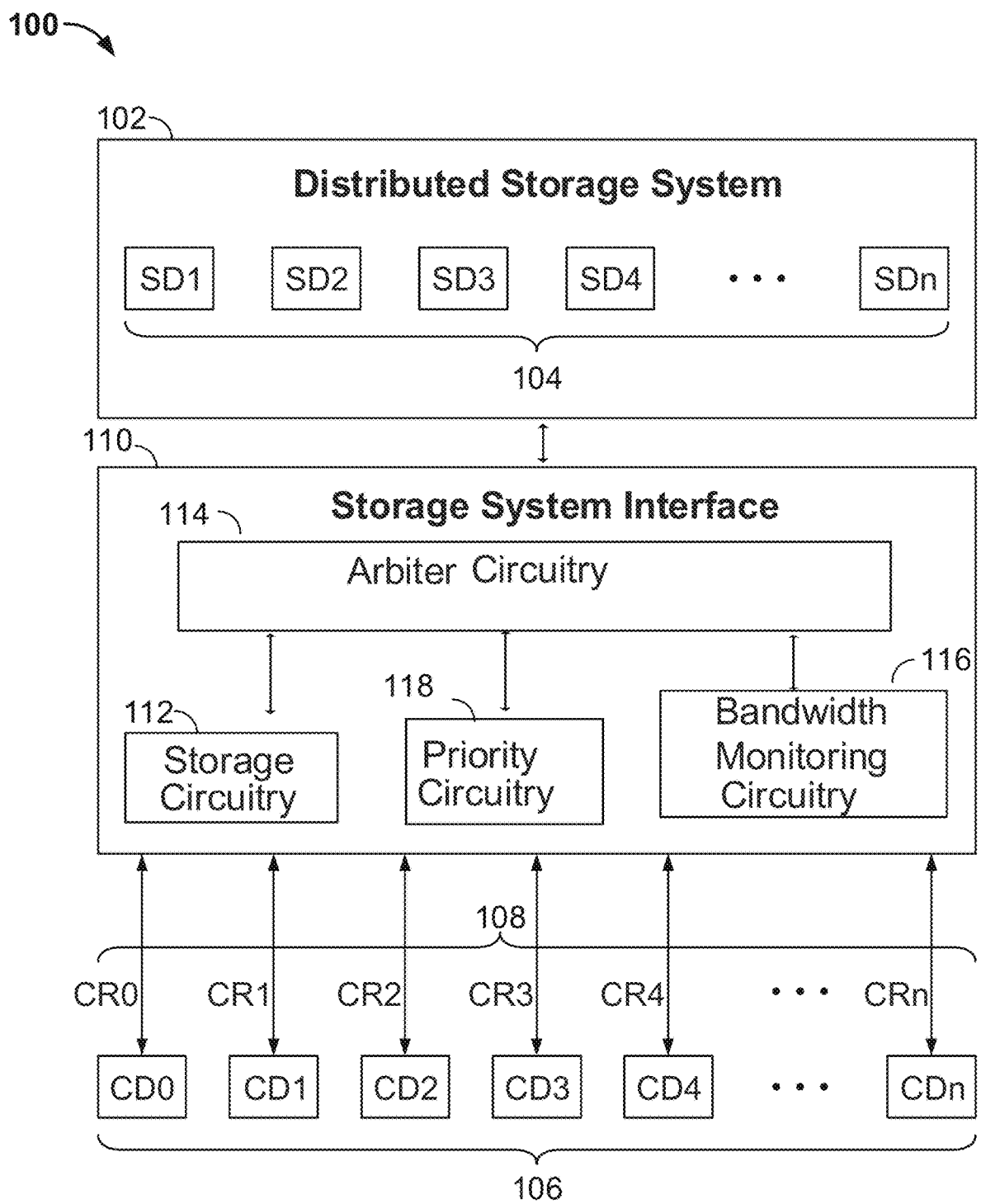
FIG. 1 shows a network architecture that schematically illustrates a throughput management of distributed storage system, in accordance with an implementation of the subject matter of this disclosure.

As described above, conventional schemes for managing access to a distributed storage system involve an operator of the distributed storage system servicing incoming requests from client devices to read data from and/or write data onto the distributed storage systems via a weighted round robin scheme or a First-In-First-Out (FIFO) manner. That is, operators of the distributed storage system service incoming requests from client devices as they are received with limited control over ensuring that storage usage by various client devices remains within limits agreed to with their customers. One existing solution implemented by operators of distributed storage systems involve setting limits on a volume of data that can be stored on or retrieved from the distributed storage system. However, such implementations require additional network signaling capabilities to inform a storage interface whether a particular client device has already met their allocated data volume within a predefined duration of time.

Moreover, servicing the queued requests to access the storage devices in the distributed storage system in a FIFO manner (or a weighted round robin scheme) can also be burdensome because certain client devices may be underserved as multiple requests from one client device may be queued ahead of them.

Therefore, in accordance with implementations of the subject matter of this disclosure, a storage system interface for servicing requests to access a distributed storage system is disclosed. More particularly, the storage system interface according to implementation of the subject matter permits or denies a client device access to the distributed storage system based on estimated bandwidth required to service a received request relative to a total bandwidth allocated to the client device transmitting the request. In an implementation, the total bandwidth allocated to the client device transmitting the request is a maximum amount of data units allowed to be processed by the storage system interface for each client device in some specific time period. For example, while conventional schemes for governing storage usage rely on monitoring a volume of data stored on and/or transferred from the distributed storage system, the currently disclosed implementations provide for governing storage usage based on a volume of data stored on and/or transferred from the distributed storage system within a unit time (i.e., bandwidth of data transferred over a network connection). This reduces the additional network signaling related to data storage because monitoring of network traffic and bandwidth is done already as part of network management.

In an implementation, the storage system interface maintains, in a storage circuitry, a data structure storing a maximum amount of data that is to be transferred over a network from a client device to be stored in storage devices of the distributed storage system, or a maximum amount of retrieved data that is transferred from the storage devices of the distributed storage system to a client device, for a plurality of client devices over a predetermined time interval (i.e., the total bandwidth allocated to the client device).

Specifically, the storage system interface, via a bandwidth monitoring circuitry, monitors an actual bandwidth amount used for servicing one or more requests received from respective ones of the plurality of client devices over a network and updates the current bandwidth utilization amount for the respective ones of the plurality of client devices stored in the data structure. In other words, the bandwidth monitoring circuitry monitors the amount of data that is to be transferred over the network from the client device to be stored in storage devices of the distributed storage system, or the amount of retrieved data that is transferred from the storage devices of the distributed storage system to the client device within a predefined period of time upon servicing the request. The storage system interface also maintains a record of a current bandwidth utilization amount for each of the plurality of client devices, which is updated each time a request from a client device is serviced during the time interval.

The bandwidth monitoring circuitry also determines an expected bandwidth utilization amount for servicing a request received from respective ones of the plurality of client devices over the network. That is, the bandwidth monitoring circuitry determines the amount of data expected to be transferred over the network from the client device to be stored in storage devices of the distributed storage system, or the amount of retrieved data expected to be transferred from the storage devices of the distributed storage system to the client device within a predefined period of time upon servicing the request. In an implementation, the bandwidth monitoring circuitry estimates the expected bandwidth utilization amount for servicing the request based on an average actual bandwidth utilized for servicing such requests in prior time intervals. In a distributed storage system, where, in order to service one request, data may be stored on and/or retrieved from a plurality of storage devices interconnected over a network and remote from each other. In such an example, the throughput required for servicing the request may be higher than when the data is stored on and/or retrieved from a single storage device. In an implementation, the bandwidth monitoring circuitry estimates the expected bandwidth utilization amount for servicing such request based on an average actual bandwidth utilized for servicing similar requests for storage and/or retrieval of data from multiple remotely located storage devices interconnected over a network in prior time intervals.

The storage system interface, upon receiving a request from a client device to access the distributed storage device, determines whether to (i) permit or (ii) deny the client device transmitting the request access to the distributed storage system based on a function of the expected bandwidth utilization of the request relative to the total bandwidth utilization amount allocated to the requesting client device. Specifically, the storage system interface calculates a difference between (i) the total bandwidth allocated to the client device and (ii) the current bandwidth utilization amount and compares the difference to the expected bandwidth utilization amount for servicing the request.

Specifically, the storage system interface, via an arbiter circuitry, denies the client device transmitting the request access to the distributed storage system when the expected bandwidth utilization amount for servicing the received request is greater than the difference between (i) the total bandwidth utilization amount allocated to the client device transmitting the request and (ii) the current bandwidth amount utilized by the client device transmitting the request during the time interval. Similarly, the storage system interface, via the arbiter circuitry, permits the client device transmitting the request access to the distributed storage system when the expected bandwidth utilization amount for servicing the received request is less than or equal to a difference between (i) the total bandwidth utilization amount allocated to the client device transmitting the request and (ii) the current bandwidth amount utilized by the client device transmitting the request during the time interval In one implementation, the storage system interface further includes an arbiter circuitry that arbitrates between multiple queued requests received from each of the multiple different client devices.

In one implementation, the storage circuitry also stores a minimum bandwidth value and a maximum bandwidth value assigned to each respective client device in the data structure.

In an example, the storage system interface receives requests for access to the distributed storage system from more than one client device at the same time. Therefore, there is a need to arbitrate between the multiple queued requests to determine which one to service first. As discussed above, conventional systems involve servicing incoming requests from client devices to read data from and/or write data onto the distributed storage systems via a weighted round robin scheme or a First-In-First-Out (FIFO) manner, which may leave one or more client devices underserved. In accordance with implementations of the subject matter of the present disclosure, the storage system interface includes a priority circuitry that assigns a priority level to each of the multiple different queued client requests received from the plurality of client devices. The priority circuitry assigns a high priority level to a client request from one client device when the current bandwidth utilization amount is less than the minimum bandwidth value assigned to the one client device. In one implementation, when there are multiple requests that have been assigned a high priority level, the arbiter circuitry selects each of the client requests in the high priority level to allow access to the distributed storage system during the time interval in a round-robin scheme.

In one implementation, the priority circuitry assigns a normal priority level to a client request from one client device when the current bandwidth utilization amount is equal to or greater than the minimum bandwidth value assigned to the one client device but less than the maximum bandwidth value assigned to the one client device. In one implementation, when there are multiple requests that have been assigned a normal priority level, the arbiter circuitry selects each of the client requests in the normal priority level to allow access to the distributed storage system during the time interval in a round-robin scheme.

In one implementation, the priority circuitry assigns a no service priority level to a client request from one client device when the current bandwidth utilization amount is equal to or greater than the maximum bandwidth value. The arbiter circuitry according to implementations of the subject matter of the present disclosure denies each of the client request in the no service priority level any access to the distributed storage system during the time interval. The various priority levels are reset at the end of the time interval.

The subject matter of this disclosure may be better understood by reference to FIGS. 1-5.

FIG. 1 is a distributed management network architecture 100 that schematically illustrates a throughput management of distributed storage (DS) system 102, in accordance with an implementation described herein. As shown, the DS system 102 comprises a plurality of storage devices 104 (SD1, SD2, SD3, SD4 . . . , SDn). A plurality of client devices 106 (CD1, CD2, CD3, CD4 . . . , CDn) can read data from or write data onto to one or more storage devices 104 SD1, SD2, SD3, SD4 . . . , SDn) in the DS system 102. In one implementation, each of the client devices 106 (CD1, CD2, CD3, CD4 . . . , CDn) send their respective client requests 108 (CR0, CR1, CR2, CR3, CR4 . . . , CRn) to access the DS system 102. Each of the client devices 106 send their respective client requests 108 over a network, which is received by a storage system interface 110. In one implementation, the storage system interface 110 is configured to manage or control access to the DS system 102.

As illustrated, in accordance with an implementation, the storage system interface 110 includes a storage circuitry 112, an arbiter circuitry 114, a bandwidth monitoring circuitry 116, and a priority circuitry 118. The storage circuitry 112 stores a total bandwidth utilization amount allocated to each of the plurality of client devices 106 for a time interval. The storage circuitry 112 also stores a current bandwidth utilization amount utilized by each of the client devices 106 during the time interval. The total bandwidth utilization amount allocated to each of the multiple different client devices is pre-determined based on a contractual agreement between the respective client devices and the distributed storage system provider and refers to a volume of data that can be transferred from the DS system 102 to a client device 106 or transferred from the client device 106 to the DS system 102 within a given period of time. The current bandwidth utilization amount for each of the client devices 106 is updated every time the client request 108 from the respective client device 106 is permitted to access the DS system 102.

As noted above, each of the client requests 108 (CR1, CR2, CR3, CR4 . . . , CRn) from respective client devices 106 is queued for accessing the DS system 102. In one implementation, the bandwidth monitoring circuitry 116 determines whether each of the client requests 108 (CR1, CR2, CR3, CR4 . . . , CRn) is one of a request to read data stored on the DS system 102 or a request to write data on the DS system 102. In one implementation, the bandwidth monitoring circuitry 116 monitors an actual bandwidth utilized for servicing each of the client requests 108 in the queue for the respective client device 106 in the time interval. The bandwidth monitoring circuitry 116 also determines an expected bandwidth utilization amount required for servicing each of the client requests 108 in the queue for the respective client device 106 in the time interval by calculating a volume of data to be read or written within a period of time when servicing the received request, as described above. In one example, a current bandwidth utilized by each of the client devices 106 just prior to beginning of the time interval is zero. The arbiter circuitry 114 retrieves the expected bandwidth utilization amount required for servicing the client request 108 received from the respective client device 106 from the bandwidth monitoring circuitry 116. In one implementation, at any time during the time interval, the arbiter circuitry 114 determines that the expected bandwidth utilization amount required for servicing the client request 108 received from the respective client device 106 is less or equal to a difference between the total bandwidth utilization amount allocated to the respective client device 106 and the current bandwidth amount utilized by the respective client device 106 during the time interval. In this implementation, the arbiter circuitry 114 permits the client device 106 to access the DS system 102. In another implementation, at any time during the time interval, the bandwidth monitoring circuitry 116 determines that the expected bandwidth utilization amount required for servicing the client request 108 received for the respective client device 106 is greater than the difference between the total bandwidth utilization amount allocated to the respective client device 106 and the current bandwidth amount utilized by the respective client device 106 during the time interval. In this implementation, the arbiter circuitry 114 denies the client device 106 access to the DS system 102.

In one implementation, the arbiter circuitry 114 sets a value for each of the current bandwidth for each of the client devices 106 prior to the time interval. In one example, the arbiter circuitry 114 sets the value to be zero. The arbiter circuitry 114 resets the current bandwidth for each of the client devices 106 at the end of the time interval. In one example, at the end of the time interval, the arbiter circuitry 114 determines that a current bandwidth utilization amount for the respective client device 106 is less than or equal to its total bandwidth utilization amount allocated during the time interval. The arbiter circuitry 114 then resets the current bandwidth utilization amount of the respective client device 106 to zero. In another example, at the end of the time interval, the arbiter circuitry 114 determines that a current bandwidth utilization amount for the respective client device 106 is greater than the total bandwidth utilization amount allocated during the time interval. The arbiter circuitry 114 then resets the current bandwidth of the respective client device 106 to be a value equal to a difference between value of the current bandwidth and value of the total bandwidth utilization amount allocated for the time interval. Thus, when a new time interval begins, current bandwidth of each of the client devices 106 is reset to an initial value.

In one implementation, the priority circuitry 118 assigns a priority level to each of the queued client requests. The priority level is assigned based on the current bandwidth utilized by the respective client device 106 to access the DS system 102 relative to the total bandwidth utilization amount allocated to the respective client device 106 during the time interval. As noted above, total bandwidth utilization amount allocated to the respective client device 106 includes the respective minimum bandwidth value and the respective maximum bandwidth value. A high priority level is assigned to the client request 108 when the current bandwidth utilized by the respective client device 106 requesting access to the DS system 102 is less than the respective minimum bandwidth value during the time interval. A normal priority level is assigned to the client request 108 when the current bandwidth utilized by the respective client device 106 requesting access to the DS system 102 is equal to or greater than the respective minimum bandwidth value but less than the respective maximum bandwidth value during the time interval. A no service priority level is assigned to the client request 108 when the current bandwidth utilized by the client device 106 for requesting access to the DS system 102 is equal to or greater than the respective maximum bandwidth value during the time interval. The priority level for each of the client requests changes when requesting access to the DS system 102 over a period of the time interval.

In one implementation, arbiter circuitry 114 manages access to the DS system 102 requested by each of the client devices 106 during the time interval. As discussed above, each of the client requests 108 may be assigned one of the three priority levels (high, normal, or no-service) based on their current bandwidth utilization amount relative to a total allocated bandwidth utilization amount. In one implementation, the arbiter circuitry 114 allows access to the client request 108 for a respective client device 106 having a high priority level prior to allowing access to a client request 108 for a respective client device 106 having the normal priority level. In one implementation, the arbiter circuitry 114 denies any access to a client request 108 from a respective client device 106 having a no-service priority level as described in greater detail hereinbelow.

In one implementation, when two or more client requests 108 with the high-priority level are in the queue, the arbiter circuitry 114 grants access to each of the client requests 108 with high priority level according to a round-robin scheme (element 218 in FIG. 2) prior to granting access to the client requests 108 with the normal priority level in the queue.

In one implementation, when one or more client requests 108 with the high-priority level are in the queue, but there are no pending commands in any of these client requests 108 with the high-priority level then the arbiter circuitry 114 grants access to the client requests 108 with the normal priority level in the queue according to the round-robin scheme (element 220 in FIG. 2).

In one implementation, when none of the client requests 108 with a high-priority level are in the queue, then the arbiter circuitry 114 grants access to each of the client requests 108 with the normal priority level in the queue according to the round-robin scheme (element 220 in FIG. 2).

In one implementation, the arbiter circuitry 114 denies access to all the client requests 108 with the no-service priority levels in the queue.

Figure 2A:
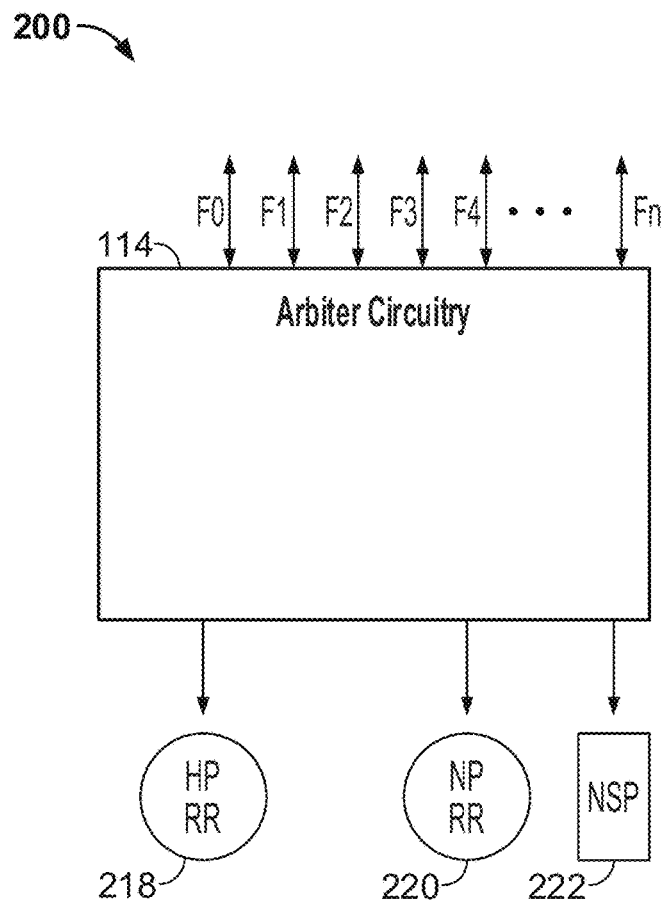
FIG. 2A shows an example of an arbiter circuitry in accordance with implementations of the subject matter of this disclosure.

FIG. 2A shows an example of a throughput management arbitration 200 during a time interval 202 performed by the arbiter circuitry 114 to arbitrate between the plurality of client requests 108 received from their respective client device 106 to access the DS system 102 in the distributed management architecture 100 of FIG. 1. As discussed above, the storage system interface 110 receives requests for access to the DS system 102 from more than one client device at the same time. Therefore, there is a need to arbitrate between the multiple queued requests to determine which one to service first, especially when none of the client devices have reached their respective total allocated bandwidth utilization amounts. Accordingly, each of the client requests 108 are assigned one of the three priority levels (high, normal, or no-service) based on the current bandwidth utilization amount of the client device transmitting the request relative to the agreed upon minimum and maximum allocated bandwidth utilization amounts for the client device transmitting the request. As will be described in greater detail below in connection with FIGS. 2A-2G, the assignment of priority levels to incoming requests allows an operator of a DS system 102 to prioritize servicing of incoming requests from clients having a higher agreed upon minimum and maximum allocated bandwidth utilization amounts.

In one implementation, requests 108 from each of plurality of the client devices 106 (client devices F0, F1, F2, F3, F4 . . . , Fn in FIG. 2A) to access the system DS 102 are received at the arbiter circuitry 114 of the storage system interface 102. As noted above, client requests 108 are one of read commands (data to be retrieved from the DS system 102) or write commands (data to be transferred for storage onto the DS system 102).

In one implementation, one of the high, normal or no-service priority levels are assigned to requests received from each of the client devices F0, F1, F2, F3, F4 . . . , Fn during the time interval 202 based on their respective current bandwidth utilization amount in order to queue them for servicing. In one example, each of the requests received from client devices F0, F1, F2, F3 F4, . . . , Fn assigned with high priority level are processed in a high priority round robin (HPRR) scheme 218. In another example, each of the requests received from client devices F1, F2, F3 F4, . . . , Fn assigned with normal priority level are processed in a normal priority round robin (NPRR) scheme 220. In a further example, each of the requests received from client devices F1, F2, F3 F4, . . . , Fn assigned with no service priority (NSP) 222 are not processed. As discussed above, conventional schemes for arbitrating between incoming requests merely use the round robin scheme for all incoming requests (i.e., the first received request is serviced first), which may leave one or more client devices underserved. In contrast, the presently disclosed systems and methods provide for assigning a high priority level to incoming requests from client devices 106 which have not reached their agreed upon minimum current bandwidth utilization amounts, and assigning a normal priority level to incoming requests from client devices 106 which have reached their agreed upon minimum current bandwidth utilization amounts. The requests assigned high priority can then be serviced in the order they are received at the storage system interface 110, while requests assigned normal priority are only serviced when there are no queued high priority requests. This allows for client devices that have not utilized a high percentage of their agreed upon total allocated bandwidth utilization amount to have their requests for access to the DS system 102 be prioritized.

FIGS. 2B-2G illustrate examples of the throughput management arbitration 200 of FIG. 2A at different times in the time interval 202 performed by the arbiter circuitry 114 to arbitrate between each of the requests received from client devices F0, F1, F2, F3 and F4. Although, only client devices F1, F2, F3 and F4 are shown for ease of illustration, the actual number of client devices may be substantially greater.

Figure 2B:
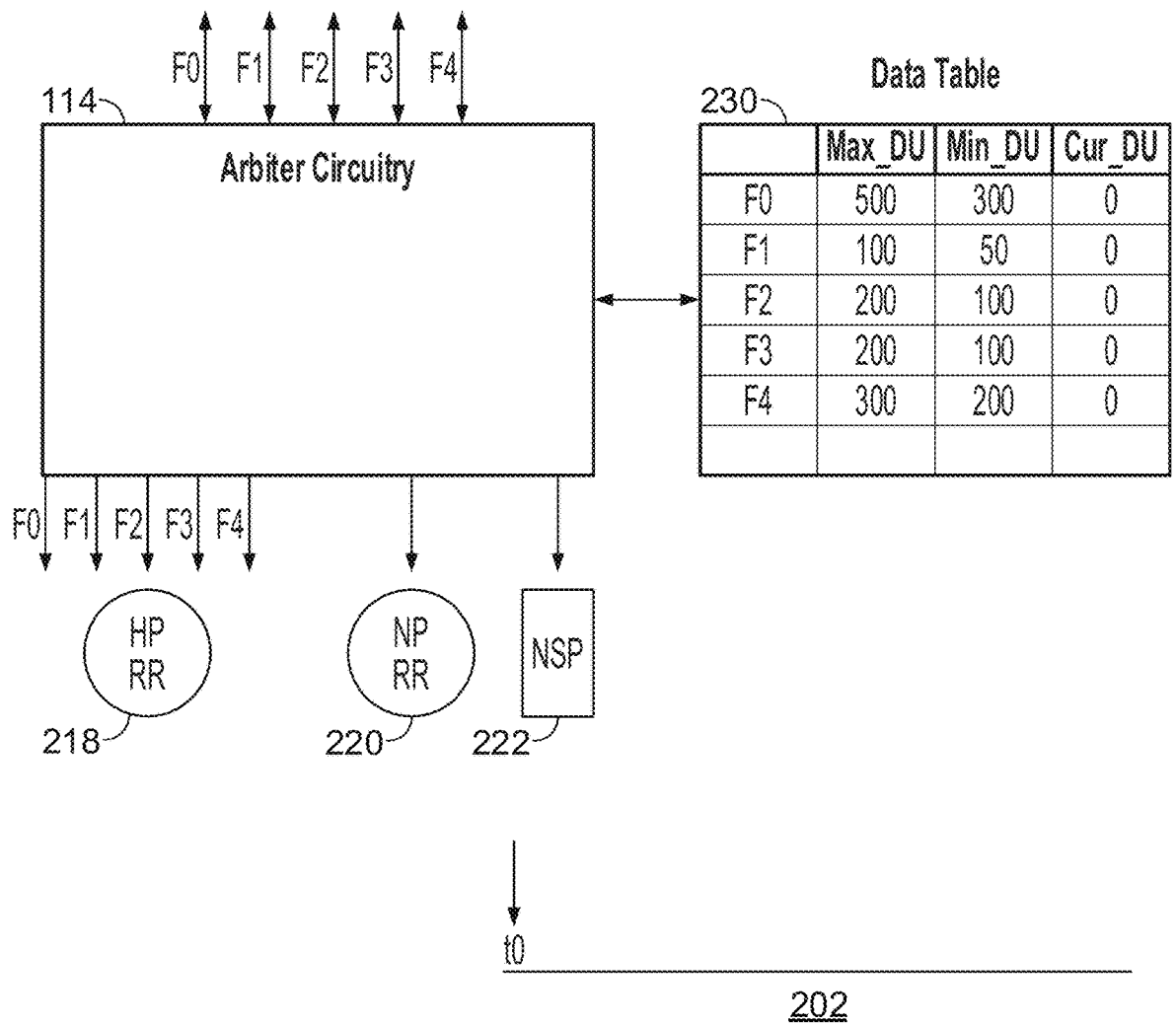
FIG. 2B shows an example of a scenario for operation of the arbiter circuitry of FIG. 2A in accordance with implementations of the subject matter of this disclosure.

FIG. 2B illustrates a scenario at a current time, t0 which is before any time (t) in the time interval 202, i.e. prior to servicing the requests received from client devices F0, F1, F2, F3, F4. A data table 230 (e.g., data structure stored in storage circuitry 112) lists each of the client devices F0, F1, F2, F3, F4 and a corresponding maximum bandwidth data units (Max_DU) and a minimum bandwidth data units (Min_DU). In an implementation, Max_DU and Min_DU assigned to each of the F0, F1, F2, F3, F4 is pre-determined based on an agreement between an operator of the DS system 102 and the respective client devices. In one example shown in FIGS. 2B-2G, the Max_DU and Min_DU for F0 are 500 and 300 respectively, the Max_DU and Min_DU for F1 are 100 and 50 respectively the Max_DU and Min_DU for F2 are 200 and 100 respectively, the Max_DU and Min_DU for F3 are 200 and 100 respectively and the Max_DU and Min_DU for F4 are 300 and 200 respectively. In one implementation, the table 230 also lists a current bandwidth (Cur_DU) of each of the client devices F0, F1, F2, F3 and F4. As illustrated in FIG. 2B, at the current time, t0 prior to any time (t) in the time interval, the Cur_DU is set to 0 for each of the client devices F0, F1, F2, F3 and F4, since none of the client devices F0, F1, F2, F3 and F4 have transmitted a request requiring servicing by the storage system interface. Thus, at the current time t0, each of the request received from client devices F0, F1, F2, F3, F4 are assigned the high priority level and processed under the HPRR scheme 218.

Figure 2C:
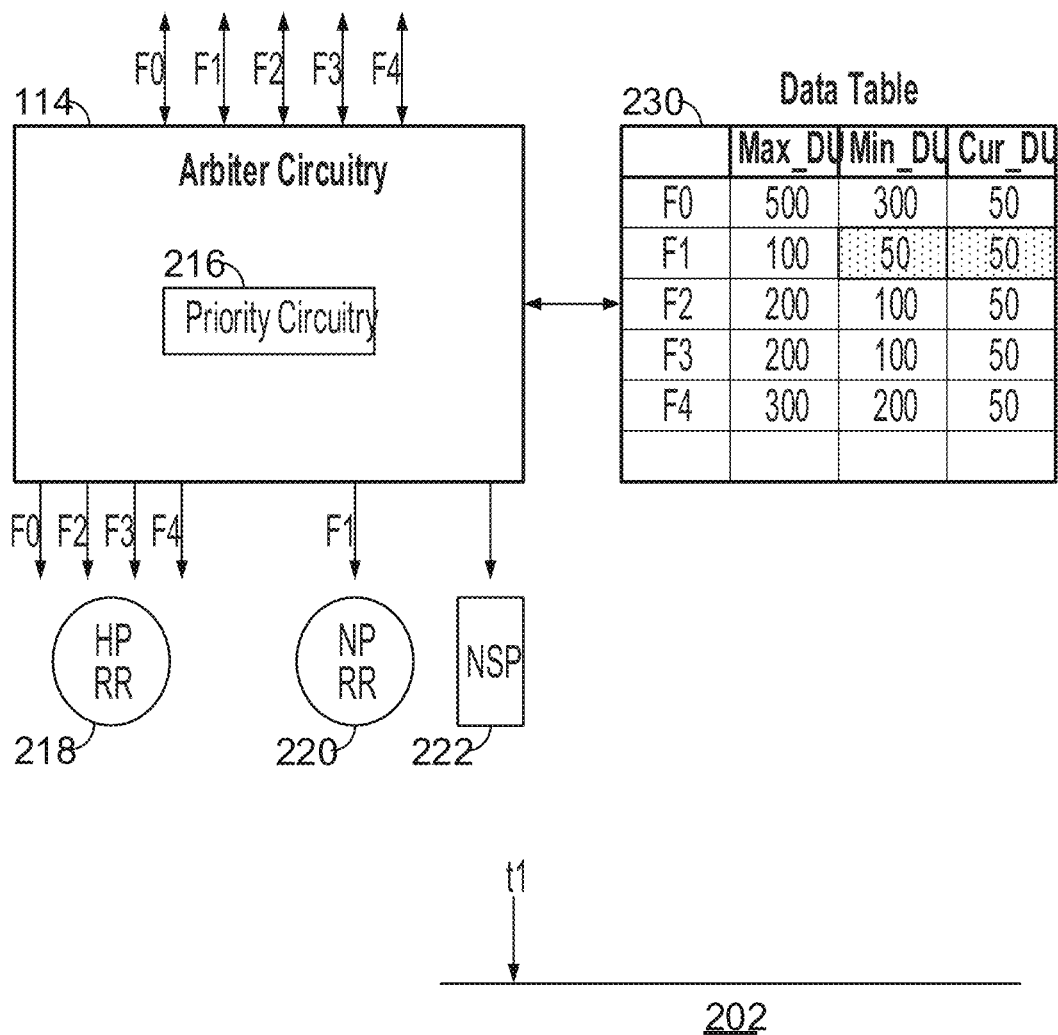
FIG. 2C shows an example of a scenario for operation of the arbiter circuitry of FIG. 2 in accordance with implementations of the subject matter of this disclosure.

FIG. 2C illustrates a scenario at a current time, t1, in the time interval 202, which is after the time to. As shown in the table 230, at t1, Cur_DU for each of the client devices F0, F1, F2, 3 and F4 is 50, which indicates that requests from each of the client devices F0, F1, F2, F3 and F4 have been processed and that the actual bandwidth utilization amount for servicing corresponding requests from each of the client devices F0, F1, F2, F3 and F4 was equal to 50 data units. However, only client device F1 has reached its Min_DU of 50. Thus, at t1, F1 is assigned the normal priority level and will now be processed under the NPRR scheme 220. Client devices F0, F2, F3 and F4 continue to be processed via the HPRR scheme 218 since none of them have reached their corresponding Min_DU.

Figure 2D:
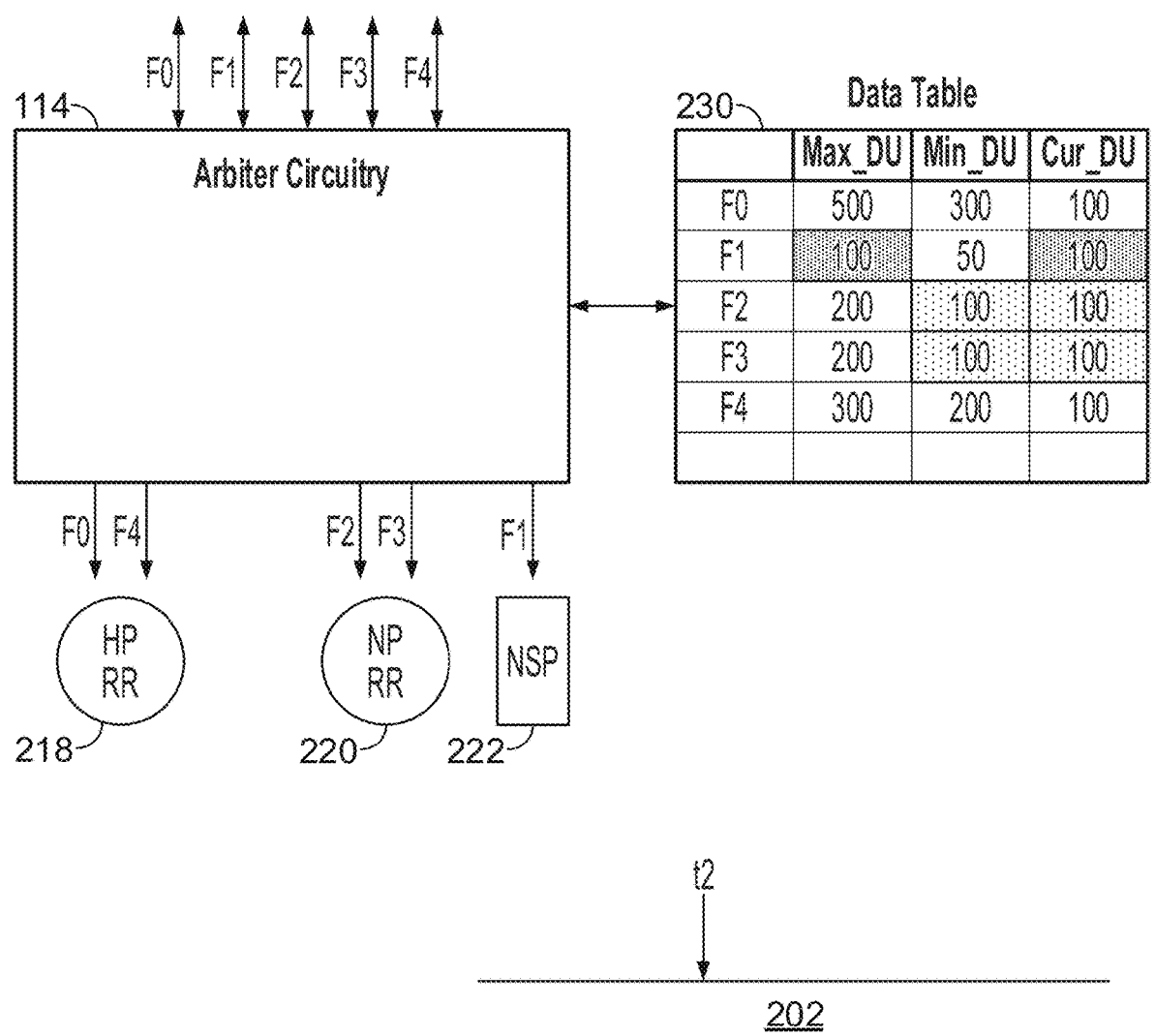
FIG. 2D shows an example of a scenario for operation of the arbiter circuitry of FIG. 2A in accordance with implementations of the subject matter of this disclosure.

FIG. 2D illustrates a scenario at a current time, t2, in the time interval 202, which is after the time t1. As shown in the table 230, at t2, Cur_DU for each of the client devices F0, F1, F2, 3 and F4 is 100, which indicates that requests from each of the client devices F0, F1, F2, F3 and F4 have been processed and that the actual bandwidth utilization amount for servicing corresponding requests from each of the client devices F0, F1, F2, F3 and F4 during the time interval (t2–t1) was equal to an additional 50 data units. However, at t2, the current bandwidth utilization amounts for client devices F2 and F3 have reached their corresponding Min_DU of 100. Thus, client devices F2 and F3 will now be processed under the NPRR scheme 220. Also, at t2, client devices F0 and F4 have still not reached their corresponding Min_DU of 300 and 400 respectively. Thus, F0 and F4 will continue to be processed under the HPRR scheme 218. Further, at t2, the Cur_DU for client device F1 is 100, which indicates that F1 has reached its Max_DU of 100 and will placed in the NSP 222. Thus, any pending requests from client device F1 will not be processed during the time interval 202.

Figure 2E:
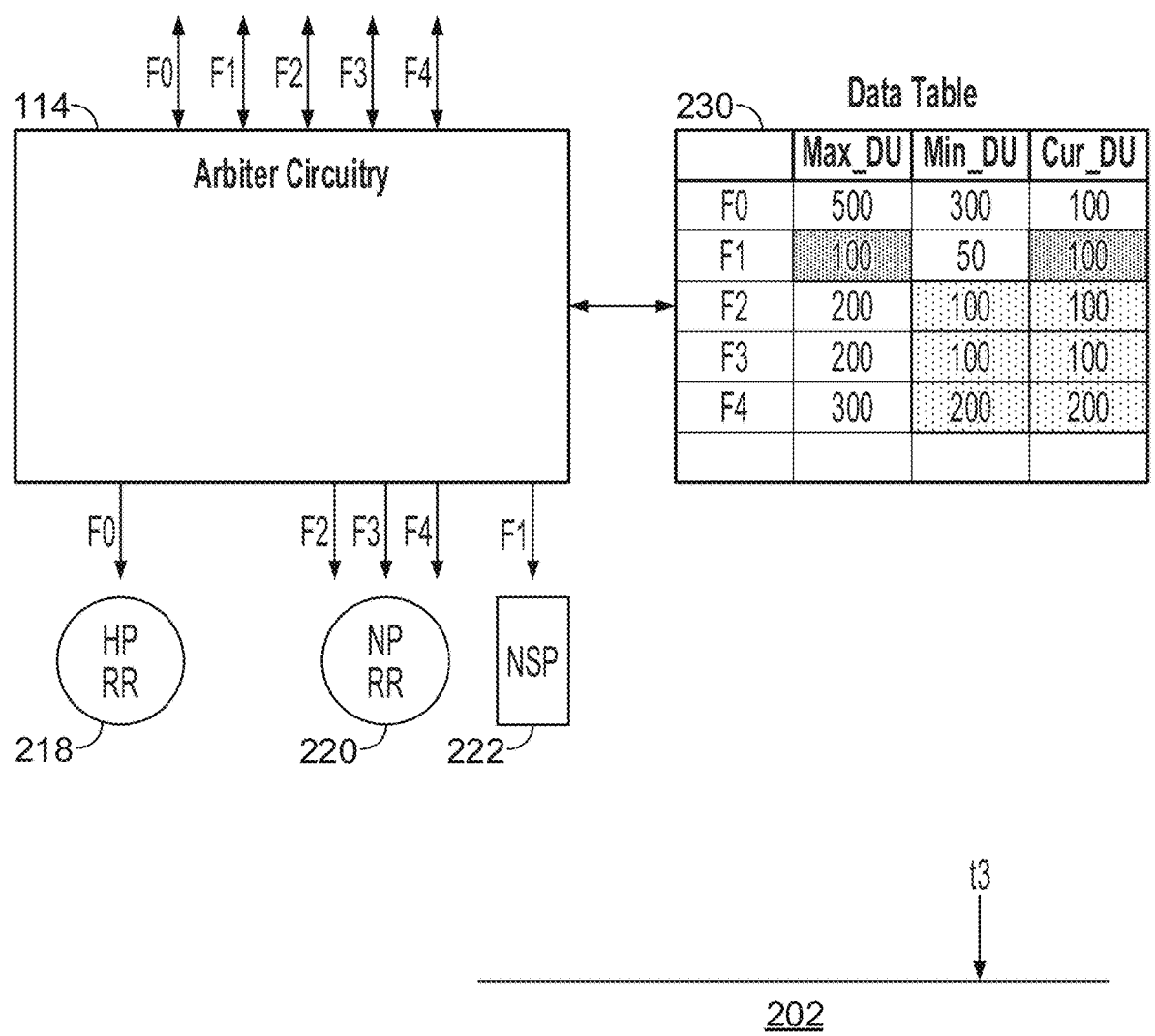
FIG. 2E shows an example of a scenario for operation of the arbiter circuitry of FIG. 2A in accordance with implementations of the subject matter of this disclosure.

FIG. 2E illustrates a scenario at a current time, t3, in the time interval 202, which is after the time t2. As shown in the table 230, at time t3, Cur_DU for client device F4 is 200, which indicates that client device F4 has reached its corresponding Min_DU of 200. Thus, at time t3, requests from client device F4 will no longer be processed under the HPRR scheme 218 and instead will be processed under NPRR scheme 220. Also, at t3, Cur_DU for client devices F2 and F3 remain at 100, which is equal to their corresponding Min_DU of 100 but less than their corresponding Max_DU of 200 and thus continue to be processed via the NPRR scheme 220. Also as shown in the table 230, at t3, Cur_DU for F0 remains at 100 which is less than the corresponding Min_DU of 300. Thus, F0 will continue to be processed via the HPRR scheme 218.

Figure 2F:
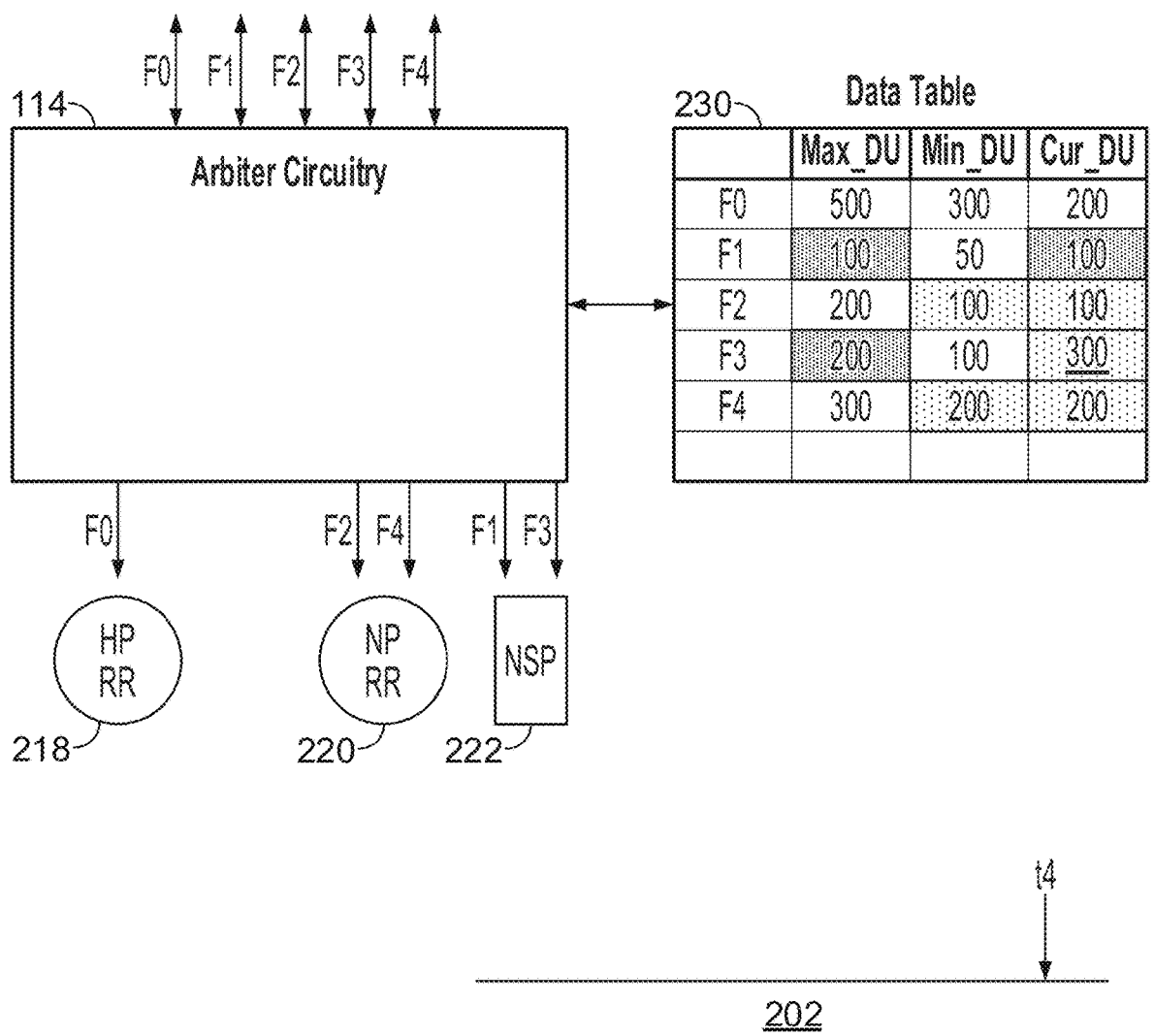
FIG. 2F shows an example of a scenario for operation of the arbiter circuitry of FIG. 2A in accordance with implementations of the subject matter of this disclosure.

FIG. 2F illustrates a scenario at a current time, t4, in the time interval 202, which is after the time t3. As shown in the table 230, at t4, the Cur_DU for client device F3 is 300, which is 100 DU greater than its Max_DU of 200. As such, client device F3 at t3 utilized an additional 100 DU of bandwidth than the Max_DU of 200 and will be placed in the NSP 222. Thus, any pending commands in F3 will not be processed during the remainder of time interval 202. Also as shown, in the table 230, at t4, the Cur_DU for client devices F2 and F4 remain below their corresponding Max_DU of 200 and 300 respectively and continue to be processed via the NPRR scheme 220. Further, as shown in the table 230, the Cur_DU for client devices F0 remains below its corresponding Max_DU of 500 and will continue to be processed via the HPRR scheme 218.

Figure 2G:
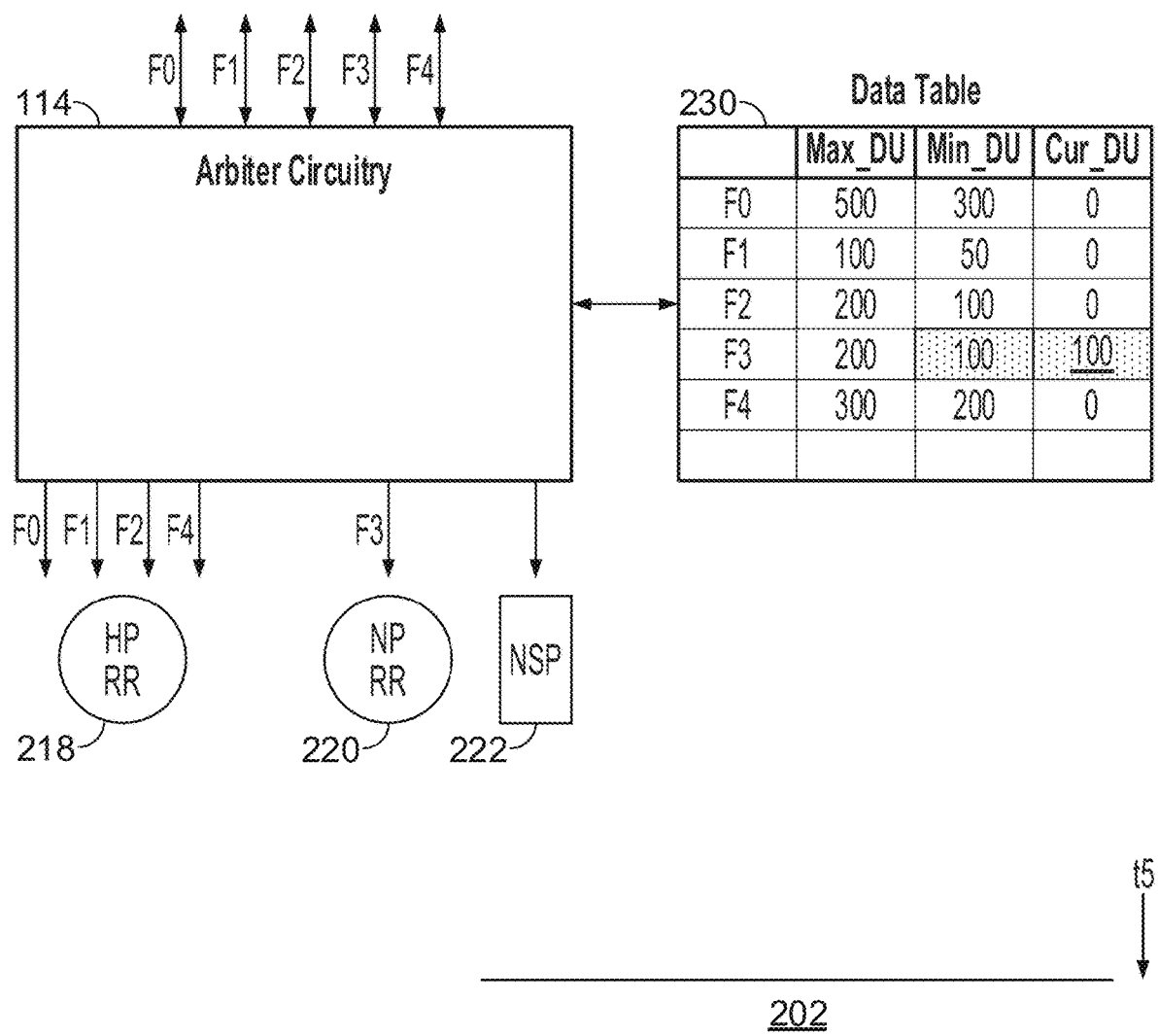
FIG. 2G shows an example of a scenario for operation of the arbiter circuitry of FIG. 2A in accordance with implementations of the subject matter of this disclosure.

FIG. 2G illustrates a scenario at a current time, t5, which is after t4 and at the end of the time interval 202. As shown in the table 230, at t5, a new time interval of servicing of the request from client devices F0, F1, F2, F3, and F4 will start such that each of the Cur_DU for each of the client devices F0, F1, F2, and F4 will be reset to 0. However, at t5, the Cur_DU for client device F3 is set to 100 since it utilized an additional 100 DU of bandwidth at t4 than the Max_DU of 200 prior to t5. In an embodiment, the Max_DU for client devices F0, F1, F2, and F4 will be adjusted upwards to include any unused allocated bandwidth during the first time interval 202.

Although not shown in the figures, in one implementation, the bandwidth monitoring circuitry 116 may include a counter for counting the data units (DU) utilized during each of the times, t1, t2, t3, t4 and t5 for each of the client devices F0, F1, F2, F3 and F4. The counter can be reset during the new time interval. In another implementation, counting of data units and resetting the new time interval may be computed in software or firmware of the bandwidth monitoring circuitry 116.

In accordance with one implementation, when calculating data units in both read and write commands, either the read or the write command may be provided with more weight. For example if it is a read command, then the CU DU for the corresponding client device F0, F1, F2, F3, F4 . . . , Fn is updated with size of the read command times a first weight, which is a pre-assigned value. In another example, if it is a write command, then the CU DU for the corresponding client devices F0, F1, F2, F3, F4 . . . , Fn is updated with size of the weight command times a second weight, which is a pre-assigned value.

Figure 3:
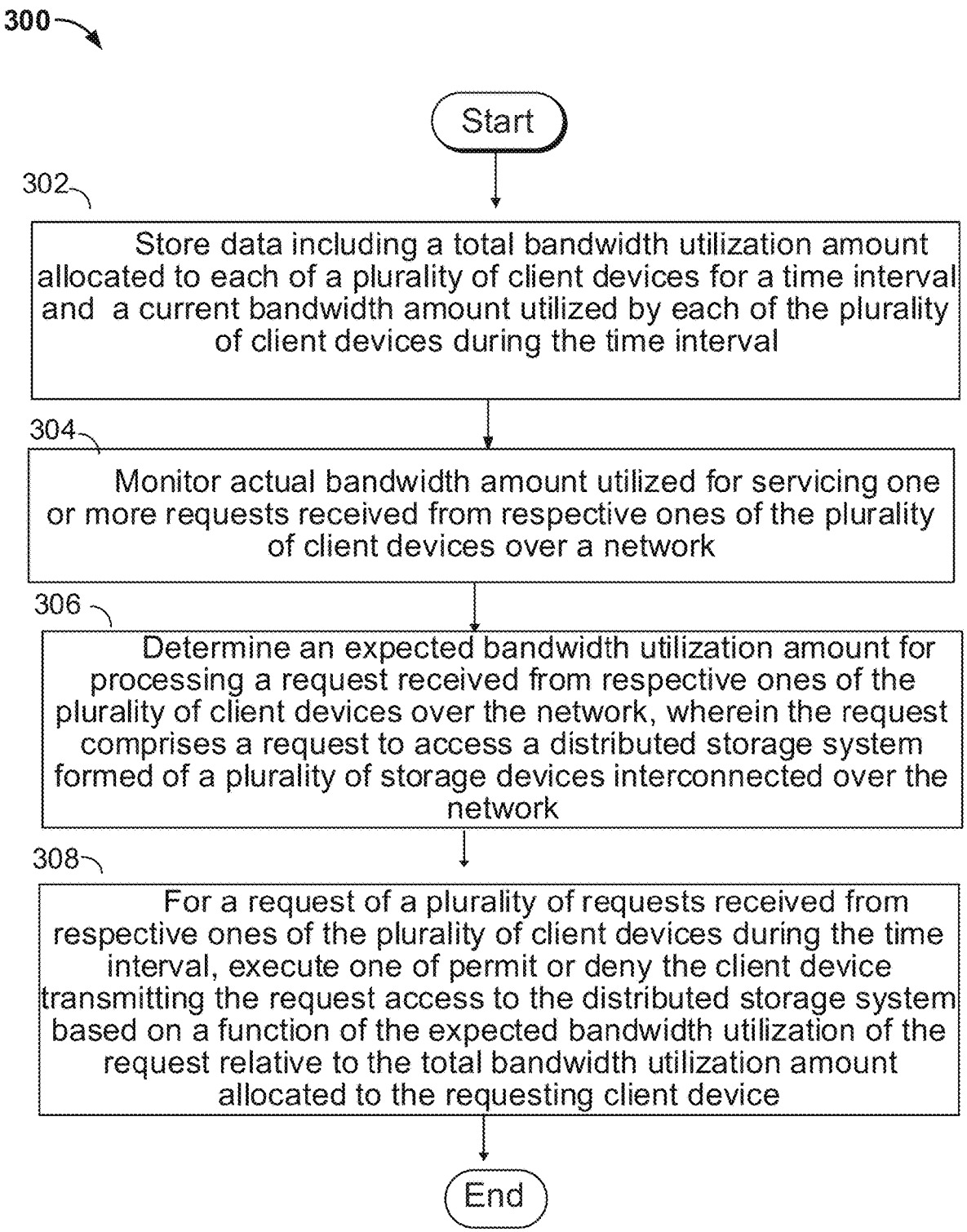
FIG. 3 is a flow diagram illustrating a method for determining whether to permit or deny a client device access to a distributed storage system, according to implementations of the subject matter of this disclosure.

A method 300 for determining whether to permit or deny a client device access to a distributed storage system, according to implementations of the subject matter of this disclosure is diagrammed in FIG. 3.

Method 300 begins at 302 where data including a total bandwidth utilization amount allocated to each of a plurality of client devices for a time interval and a current bandwidth amount utilized by each of the plurality of client devices during the time interval is stored at storage circuitry 112. At 304, a bandwidth monitoring circuitry monitors an actual bandwidth amount utilized for servicing one or more requests received from respective ones of the plurality of client devices over a network is monitored. At 306, an expected bandwidth utilization amount for servicing a request received from respective ones of the plurality of client devices over the network, wherein the request comprises a request to access a distributed storage system formed of a plurality of storage devices interconnected over the network is determined by the bandwidth monitoring circuitry. At block 308, for a request of a plurality of requests received from respective ones of the plurality of client devices during the time interval, the arbiter circuitry 114 determines whether to permit or deny the client device transmitting the request access to the distributed storage system based on a function of the expected bandwidth utilization of the request relative to the total bandwidth utilization amount allocated to the requesting client device. Method 300 ends followed by 308.

Thus, it is seen that the storage system interface 110 (including the arbiter circuitry 114 and storage circuitry 112), dynamically manage client requests to access the distributed storage system received from different client devices. Specifically, the incoming client requests are assigned various priority levels based on their respective current bandwidth utilization amounts relative to their contractually agreed upon minimum and maximum bandwidth utilization amounts, and queued for servicing based on the assigned priority level.

Figure 4:
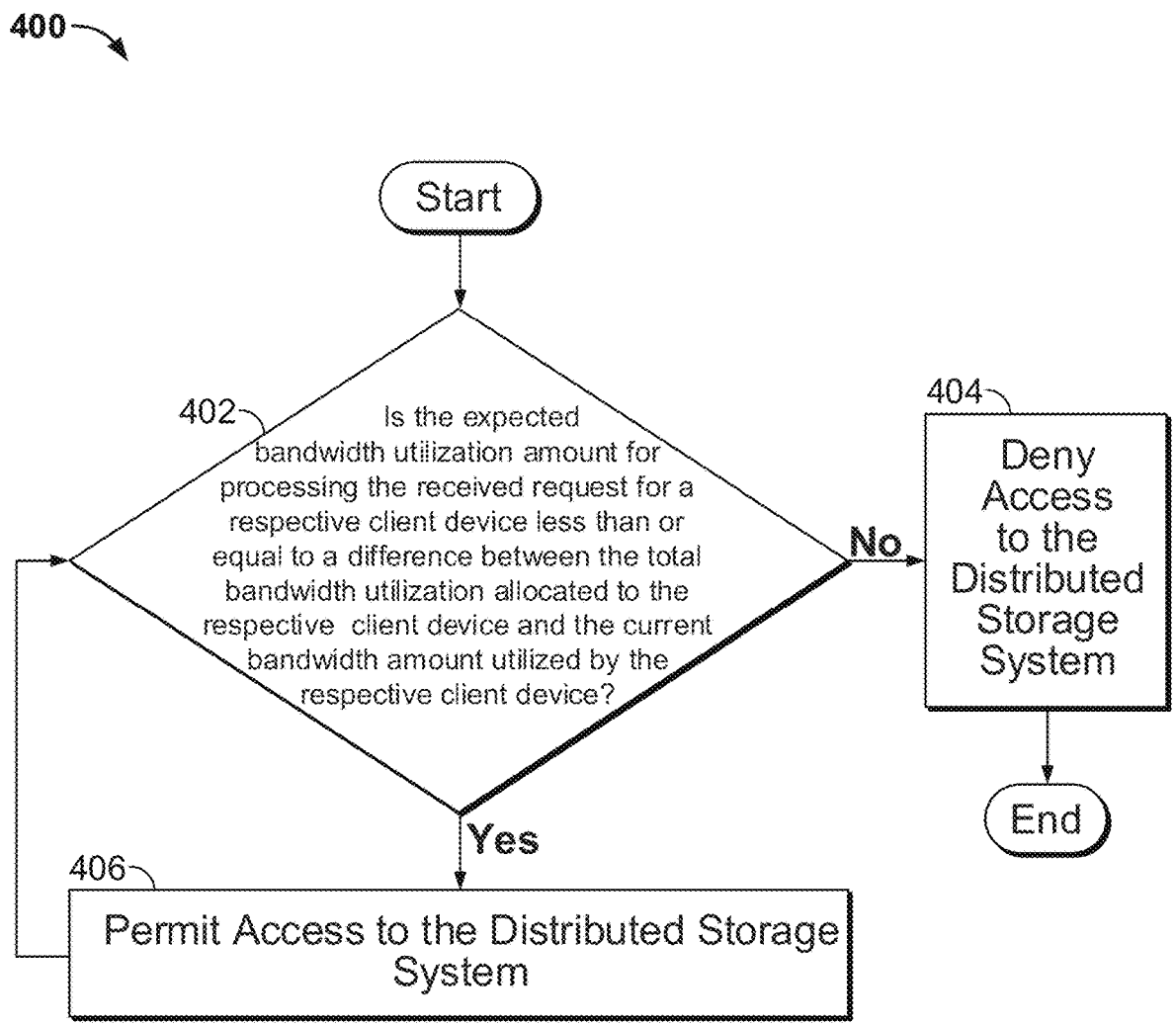
FIG. 4 is a flow diagram illustrating an implementation for determining whether to permit or deny a client device access to a distributed storage system, according to the subject matter of this disclosure.

One implementation of controlling access to distributed storage system (step 306) is shown in FIG. 4 where, at 402, it is determined whether an expected bandwidth utilization amount for servicing the received request for a respective client device less than or equal to a difference between the total bandwidth utilization allocated to the respective client device and the current bandwidth amount utilized by the respective client device. If at 402, it is determined that the expected bandwidth utilization amount for servicing the received request for the respective client device is not less than or equal to i.e. greater than) the difference between the total bandwidth utilization allocated to the respective client device and the current bandwidth amount utilized by the respective client device, then at step 404, the respective client device is denied access to the distributed storage system. If at 402, it is determined that the expected bandwidth utilization amount for servicing the received request for the respective client device is less than or equal to the difference between the total bandwidth utilization allocated to the respective client device and the current bandwidth amount utilized by the respective client device, then at step 406, the respective client device is permitted to access the distributed storage system. The process continues to execute from 406. As discussed above, managing access to the distributed storage system based on bandwidth utilization (and not based on monitoring a volume of storage capacity that is used, as is used in conventional schemes) is advantageous because of its use of existing network monitoring data that is more reliable.

Figure 5:
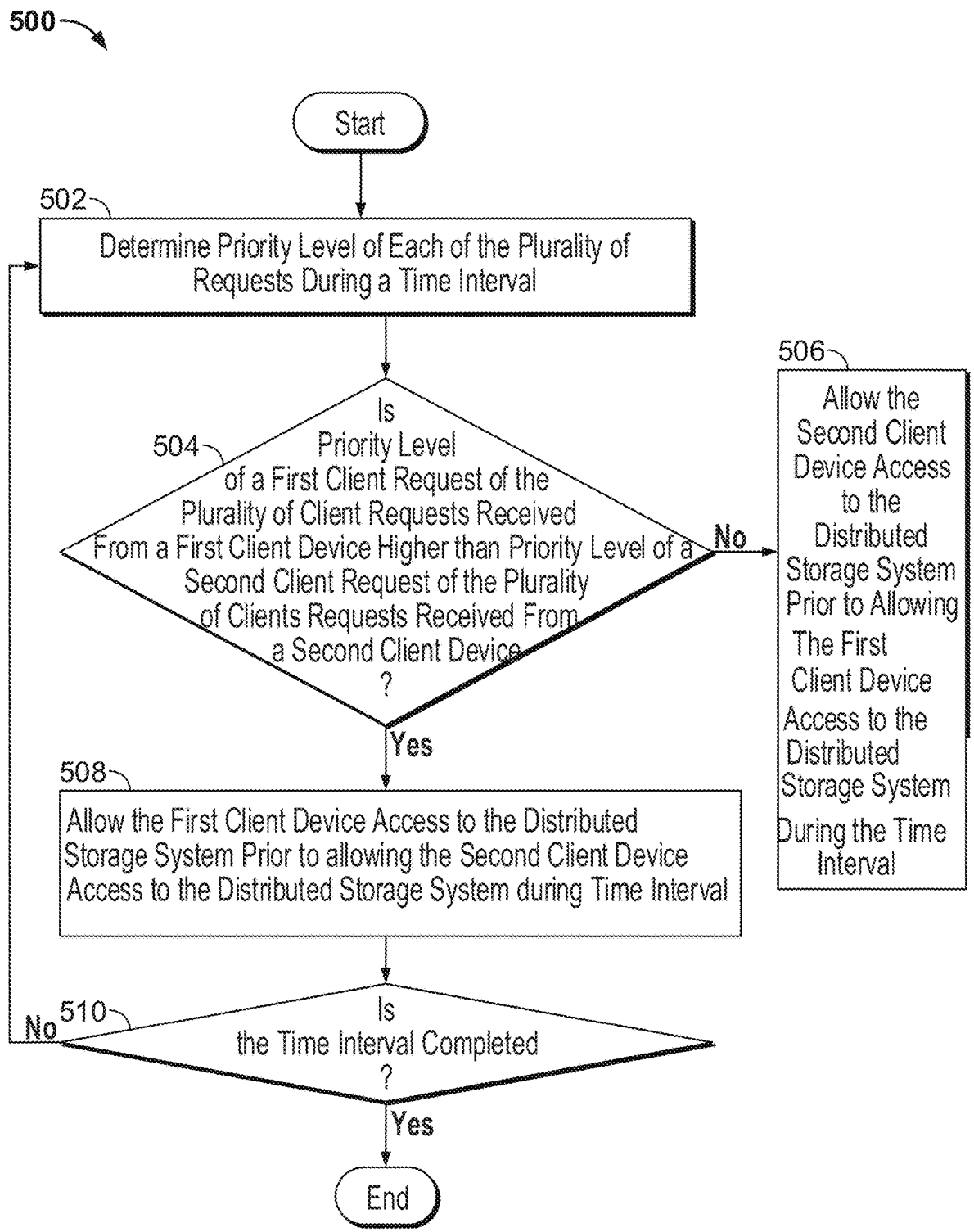
FIG. 5 is a flow diagram illustrating an implementation for assigning priority levels to each of a plurality of received requests, according to the subject matter of this disclosure.

One implementation of allowing access to the distributed storage system (step 406) is shown in FIG. 5 where, at 502, a priority level of each of the plurality of requests is determined during a time interval. At step 504, it is determined whether priority level of a first request of the plurality of requests received from a first client device is higher than a second request of the plurality of requests received from a second client device. If not, then at 506, the second client device is allowed access to the distributed storage system prior to allowing the first client device access to the distributed storage system during the time interval. If at 504, it is determined that the priority level of the first request of the plurality of requests received from the first client device is higher than the second request of the plurality of requests received from the second client device, then at 508, the first client device is allowed access to the distributed storage system prior to allowing the second client device access to the distributed storage system during the time interval. At 510, it is determined whether the time interval is completed. If not, then the process continues to execute from 502. If at 510, it is determined that the time interval is completed, then the process ends.

Thus it is seen that methods and circuitry for managing access to a distributed storage system based on bandwidth allocating and utilization, are disclosed.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims, which follow.

What is claimed is:

1. A storage system comprising:
   storage circuitry configured to store data including (i) a total bandwidth utilization amount allocated to each of a plurality of client devices for a time interval and (ii) a current bandwidth amount utilized by each of the plurality of client devices during the time interval;
   bandwidth monitoring circuitry configured to:
   monitor an actual bandwidth amount utilized for servicing one or more requests received from respective ones of the plurality of client devices over a network by updating the actual bandwidth amount utilized based on network management signals sent by the respective client device during the time interval; and
   determine an expected bandwidth utilization amount for servicing a request received from respective ones of the plurality of client devices over the network, wherein the request comprises a request to access a distributed storage system comprising a plurality of storage devices interconnected over a network; and
   arbiter circuitry configured to, for a request of a plurality of requests received from respective ones of the plurality of client devices during the time interval, (i) permit or (ii) deny the client device transmitting the request access to the distributed storage system based on a function of the expected bandwidth utilization of the request relative to the total bandwidth utilization amount allocated to the requesting client device.

2. The storage system of claim 1, wherein the bandwidth monitoring circuitry, upon receiving the request to access the distributed storage system, is further configured to:
   determine whether the received request is one of (i) a request to read data from the distributed storage system, or (ii) a request to write data into the distributed storage system.

3. The storage system of claim 2, wherein the bandwidth monitoring circuitry, upon determining that the received request is one of (i) a request to read data from the distributed storage system, or (ii) a request to write data into the distributed storage system, is further configured to:
   determine the expected bandwidth utilization amount by calculating a volume of data to be read or written within a period of time when servicing the received request.

4. The storage system of claim 1, wherein the arbiter circuitry is further configured to:
   deny the client device transmitting the request access to the distributed storage system when the expected bandwidth utilization amount for servicing the received request is greater than a difference between (i) the total bandwidth utilization amount allocated to the client device transmitting the request and (ii) the current bandwidth amount utilized by the client device transmitting the request during the time interval.

5. The storage system of claim 1, wherein the arbiter circuitry is further configured to:
   permit the client device transmitting the request access to the distributed storage system when the expected bandwidth utilization amount for servicing the received request is less than or equal to a difference between (i) the total bandwidth utilization amount allocated to the client device transmitting the request and (ii) the current bandwidth amount utilized by the client device transmitting the request during the time interval.

6. The storage system of claim 1, wherein the arbiter circuitry is further configured to update the current bandwidth amount utilized by the respective ones of the plurality of client devices after the respective ones of the plurality of client devices are permitted access to the distributed storage system.

7. The storage system of claim 1, further comprising:
   a priority circuitry communicably coupled to the arbiter circuitry, wherein the priority circuitry is configured to assign a level of priority to a respective request among the plurality of requests to access the distributed storage system based on the current bandwidth utilization amount utilized by the respective ones of the plurality of client devices and the total bandwidth utilization amount allocated to the respective ones of the plurality of client devices.

8. The storage system of claim 7, wherein:
   a first request of the plurality of requests to access the distributed storage system is received from a first client device of the plurality of client devices, and a second request of the plurality of requests to access the distributed storage system is received from a second client device different from the first client device of the plurality of client devices;
   the priority circuitry is configured to assign a first value of the priority level to the first request received from the first client device and a second value of the priority level to the second request received from the second client device based on their respective current bandwidth amount utilized, wherein the first value is higher than the second value; and
   the arbiter circuitry is configured to allow access to the distributed storage system to the first client device prior to allowing the second client device to access the distributed storage system.

9. The storage system of claim 7, wherein the priority circuitry is configured to assign one of a high priority level, a normal priority level, and a no service priority level based on their respective current bandwidth amount utilized relative to the total bandwidth utilization amount, and wherein the normal priority level is lower than the high priority level, and the no service priority level is lower than the normal priority level.

10. The storage system of claim 9, wherein:
the total bandwidth utilization amount allocated to each of the respective ones of the plurality of client devices comprise a respective maximum bandwidth value and a respective minimum bandwidth value; and
wherein the priority circuitry is configured to:
assign the high priority level to each respective request in the plurality of requests when the current bandwidth amount utilized by the respective ones of the plurality of client devices is less than the respective minimum bandwidth value;
assign the normal priority level to each respective request in the plurality of requests when the current bandwidth amount utilized by the respective ones of the plurality of client devices is equal to or greater than the respective minimum bandwidth value and less than the respective maximum bandwidth value; and
assign the no service priority level to each respective request in the plurality of requests when the current bandwidth amount utilized by the respective ones of the plurality of client devices is equal to or greater than the respective maximum bandwidth value.

11. A method comprising:
storing data including (i) a total bandwidth utilization amount allocated to each of a plurality of client devices for a time interval and (ii) a current bandwidth amount utilized by each of the plurality of client devices during the time interval;
monitoring actual bandwidth amount utilized for servicing one or more requests received from respective ones of the plurality of client devices over a network by updating the actual bandwidth amount utilized based on network management signals sent by the respective client device during the time interval;
determining an expected bandwidth utilization amount for servicing a request received from respective ones of the plurality of client devices over the network, wherein the request comprises a request to access a distributed storage system formed a plurality of storage devices interconnected over the network; and
for a request among a plurality of requests received from respective ones of the plurality of client devices during the time interval, executing one of (i) permitting or (ii) denying the client device transmitting the request access to the distributed storage system based on a function of the expected bandwidth utilization of the request relative to the total bandwidth utilization amount allocated to the requesting client device.

12. The method of claim 11, further comprising:
in response to permitting the client device transmitting the request access to the distributed storage system, permitting the client to read data from the distributed storage system when the request to access the distributed storage system is a read request and permitting the client to write data into the distributed storage system when the request to access the distributed storage system is a write request.

13. The method of claim 12, wherein determining the expected bandwidth utilization amount further comprises calculating a volume of data to be read or written within a period of time when servicing the received request.

14. The method of 11, further comprising:
denying the client device transmitting the request access to the distributed storage system when the expected bandwidth utilization amount for servicing the received request is greater than the difference between (i) the total bandwidth utilization amount allocated to the client device transmitting the request and (ii) the current bandwidth amount utilized by the client device transmitting the request during the time interval.

15. The method of 11, further comprising:
permitting the client device transmitting the request access to the distributed storage system when the expected bandwidth utilization amount for servicing the received request is less than or equal to a difference between (i) the total bandwidth utilization amount allocated to the client device transmitting the request and (ii) the current bandwidth amount utilized by the client device transmitting the request during the time interval.

16. The method of claim 11, further comprising:
updating the current bandwidth utilization amount utilized by the respective ones of the plurality of client devices after the respective ones of the plurality of client devices are permitted access to the distributed storage system.

17. The method of claim 11, further comprising:
assigning a level of priority to a respective request among the plurality of requests to access the distributed storage system based on the current bandwidth utilization amount utilized by the respective ones of the plurality of client devices and the total bandwidth utilization amount allocated to the respective ones of the plurality of client devices.

18. The method of claim 17, wherein a first request of the plurality of requests to access the distributed storage system is received from a first client device of the plurality of client devices, and a second request of the plurality of requests to access the distributed storage system is received from a second client device different from the first client device of the plurality of client devices, and the method further comprises:
assigning a first value of the priority level to the first request received from the first client device and a second value of the priority level to the second request received from the second client device based on their respective current bandwidth amount utilized, wherein the first value is higher than the second value; and
allowing access to the distributed storage system to the first client device prior to allowing the second client device to access the distributed storage system.

19. The method of claim 17, wherein:
the levels of priority comprises a high priority level, a normal priority level, and a no service priority level assigned based on their respective current bandwidth amount utilized relative to the total bandwidth utilization amount; and
the normal priority level is lower than the high priority level, and the no service priority level is lower than the normal priority level.

20. The method of claim 19, wherein the total bandwidth utilization amount allocated to each of the respective ones of the plurality of client devices comprise a respective maximum bandwidth value and a respective minimum bandwidth value, the method further comprising:
assigning the high priority level to each respective request in the plurality of requests when the current bandwidth amount utilized by the respective ones of the plurality of client devices is less than the respective minimum bandwidth value;

assigning the normal priority level to each respective request in the plurality of requests when the current bandwidth amount utilized by the respective ones of the plurality of client devices is equal to or greater than the respective minimum bandwidth value and less than the respective maximum bandwidth value; and assigning the no service priority level to each respective request in the plurality of requests when the current bandwidth amount utilized by the respective ones of the plurality of client devices is equal to or greater than the respective maximum bandwidth value.

* * * * *